United States Patent [19]
Dalton

[11] 3,937,479
[45] Feb. 10, 1976

[54] DOLLY FOR MOVING AND POSITIONING VEHICLES

[76] Inventor: Virgil D. Dalton, 2311 Bergener, San Diego, Calif. 92110

[22] Filed: July 25, 1973

[21] Appl. No.: 382,509

Related U.S. Application Data

[63] Continuation-in-part of Ser. No. 239,557, March 30, 1972, abandoned.

[52] U.S. Cl. .................................................. 280/3
[51] Int. Cl.² ........................................ B60K 27/00
[58] Field of Search .......................................... 280/3

[56] References Cited
UNITED STATES PATENTS

| | | | |
|---|---|---|---|
| 134,930 | 1/1873 | Reamy | 280/3 |
| 1,614,764 | 1/1927 | Rowell | 280/3 |
| 2,002,570 | 5/1935 | Faries et al. | 280/3 |
| 2,037,700 | 4/1936 | Bennett | 280/3 |
| 3,549,161 | 12/1970 | Pusztay | 280/3 |

*Primary Examiner*—Leo Friaglia
*Attorney, Agent, or Firm*—Brown & Martin

[57] ABSTRACT

A dolly to facilitate the manual moving and positioning of trailers and other vehicles incorporating ratchet mechanisms to provide a high mechanical advantage for moving the vehicles. The ratchet mechanism can be selected to drive in the forward or reverse direction through a ground engaging wheel. A drive disc is mounted for rotation with the ground engaging wheel and is engaged by pawls from drive and holding ratchet mechanisms. The holding ratchet mechanism is mounted on the frame of the device and the drive ratchet mechanism is mounted on a yoke carrying an actuating handle. The mechanisms also permit coasting in the selected direction only. A brake, mounted on the yoke and controlled by a mechanism on the handle, functions to lock the wheel relative to the yoke. This allows the wheel to be rotated relative to the pawls, releasing locked-in-position pawls. Other selected modes may be used to lock the wheel in position to act as a brake or disengage the wheel completely to allow free movement.

10 Claims, 10 Drawing Figures

U.S. Patent  Feb. 10, 1976  Sheet 2 of 3  3,937,479
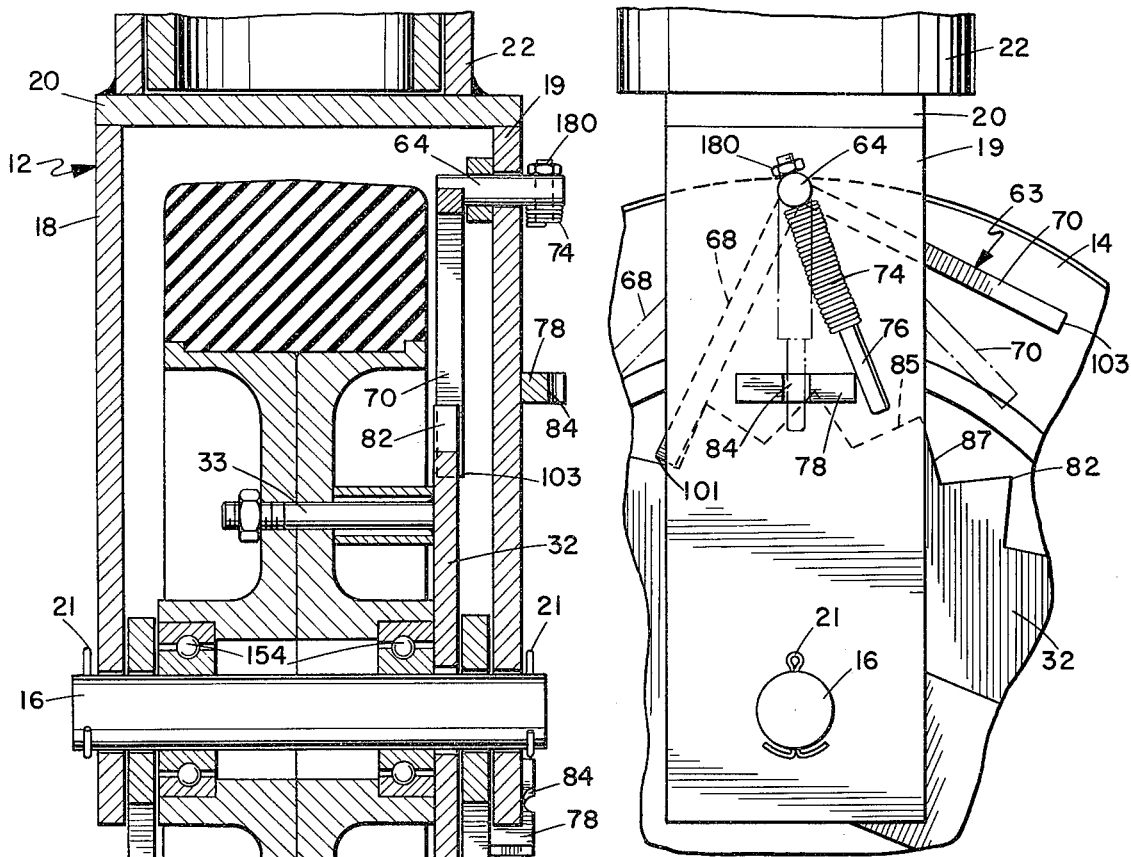
Fig. 3
Fig. 4
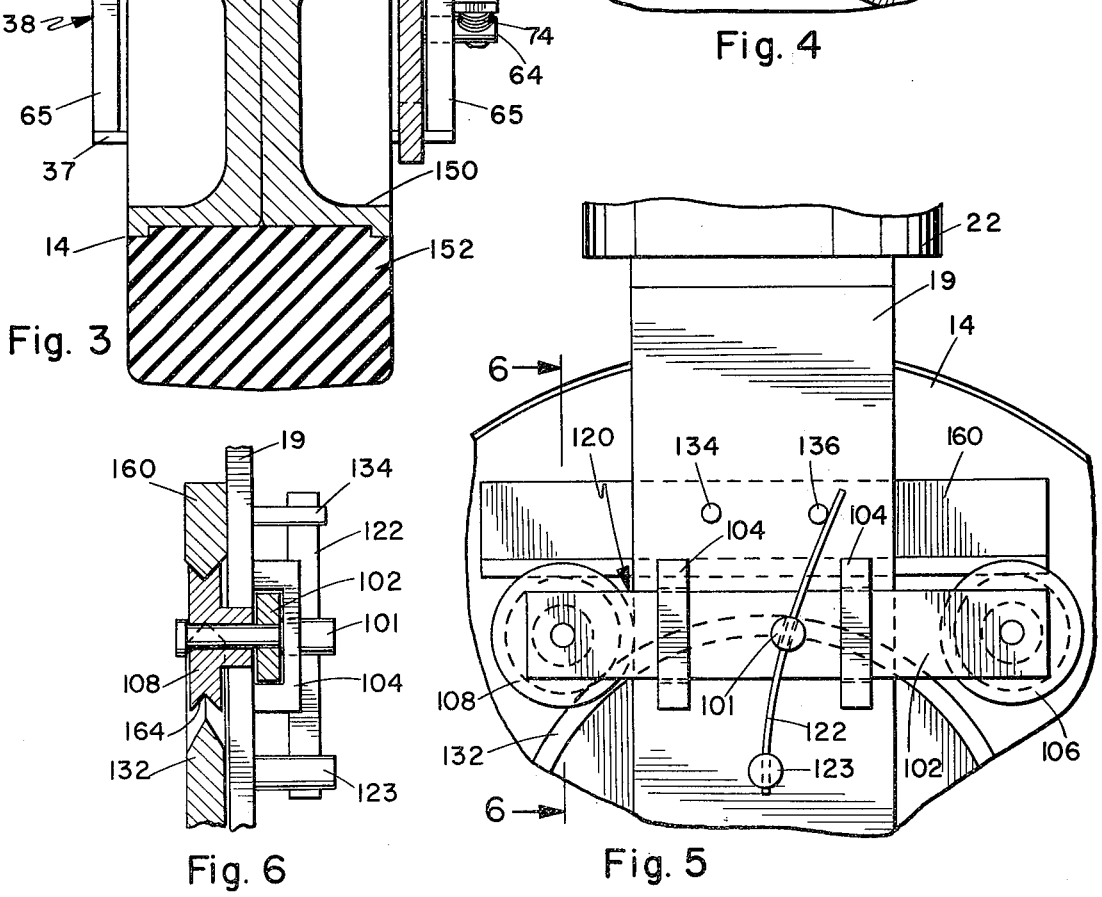
Fig. 6
Fig. 5

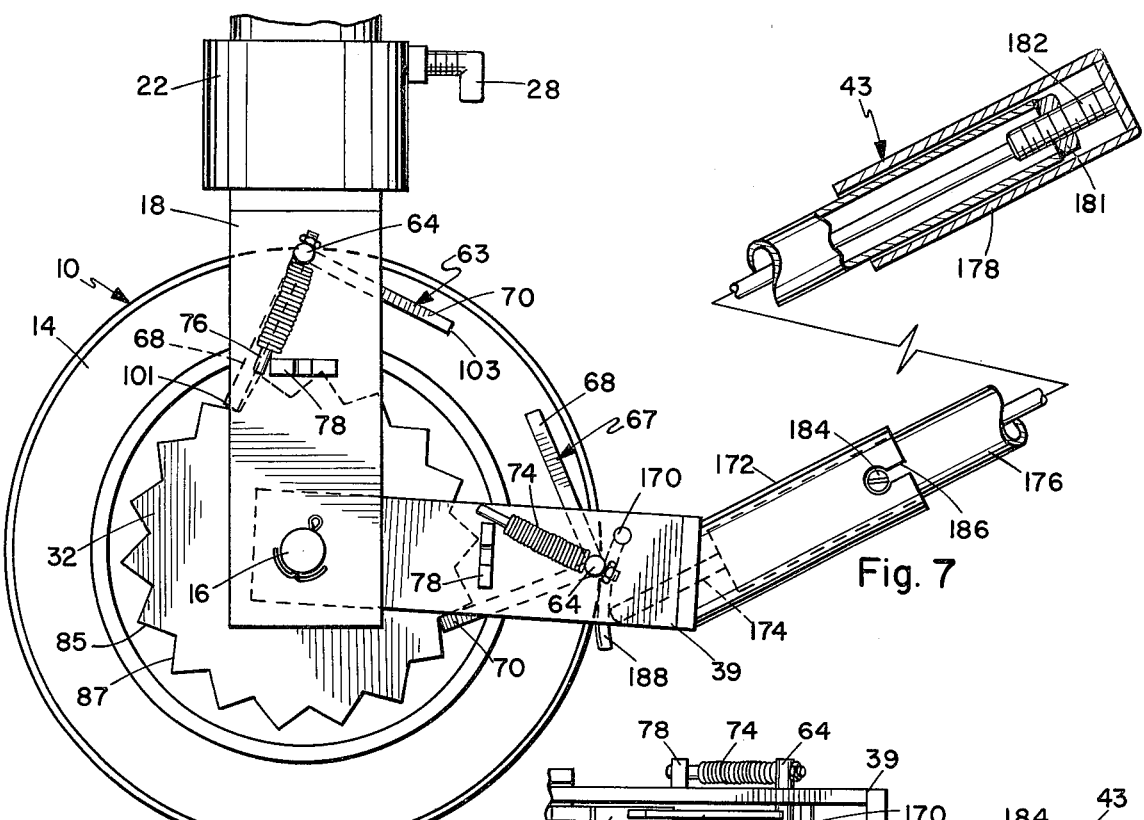
Fig. 7
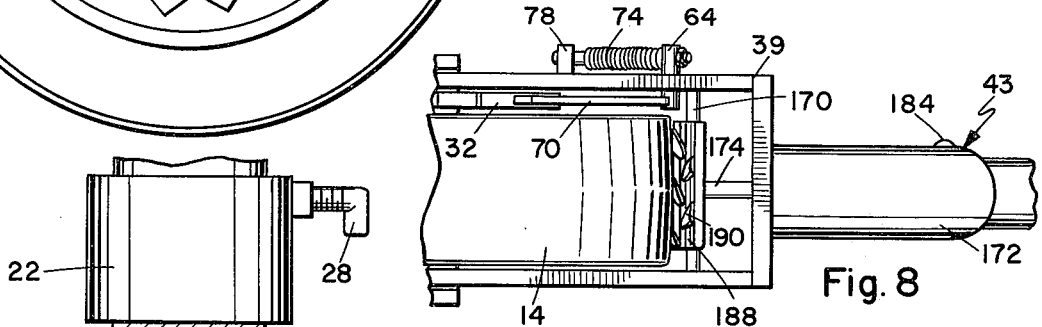
Fig. 8
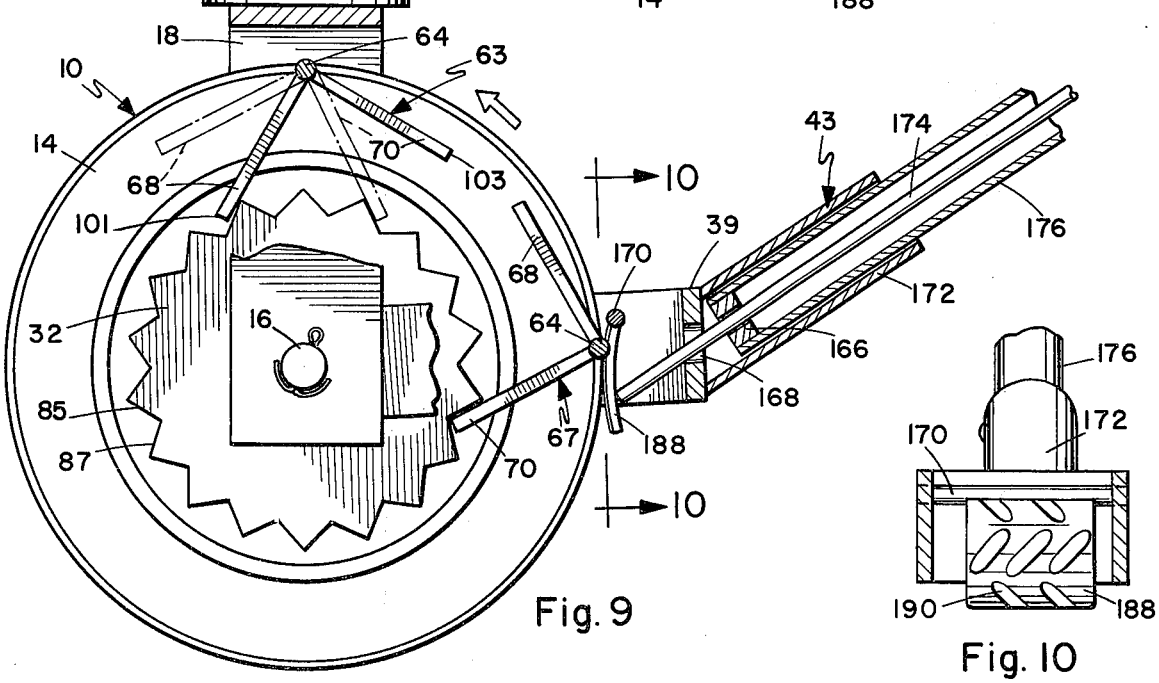
Fig. 9
Fig. 10

DOLLY FOR MOVING AND POSITIONING VEHICLES

REFERENCE TO OTHER APPLICATIONS

This application is a continuation-in-part of previously filed application Ser. No. 239,557, filed Mar. 30, 1972 and now abandoned which is entitled, "Dolly for Moving and Positioning Vehicles."

BACKGROUND OF THE INVENTION

There frequently arises a need for the movement of relatively heavy vehicles, such as house trailers, boat trailers, and aircraft from one position to another, for example, in positioning a trailer. It is often difficult, if not impossible, for an individual to move such a vehicle unassisted. Additionally, it is difficult to control the direction of movement. As a result of this need, a number of devices have been provided, that may be utilized with such vehicles to enable the manual positioning and movement of the vehicles with reduced effort and improved control.

Some of these devices incorporate a ground engaging belt or chain, or utilize elaborate gear driving mechanisms, all of which are likely to become fouled with dirt and other foreign matter. Additionally, many of those devices do not protect against roll back or provide for adequate steerage control.

Prior art devices incorporating drive mechanisms, while affording adequate mechanical advantage to move the vehicle, are excessively bulky and of complex and expensive construction.

It is therefore desirable to have an apparatus for moving and positioning vehicles that enables a single operator to move a heavy vehicle, and at the same time maintain precise directional control, especially if such an apparatus also provides for holding the vehicle against roll back on a grade and for emergency and parking brake capability.

SUMMARY OF THE INVENTION

The invention provides an apparatus that utilizes a single wheeled dolly to support the vehicle tongue weight, with a pivotal mounting for steering and a multi-mode ratchet mechanism that may be utilized to induce movement of the vehicle in either direction by repetitive oscillations of the actuating handle. The movements are induced with a high mechanical advantage, and therefore can normally be accomplished by a single operator. Two ratcheting mechanisms are incorporated to provide three basic modes of operation. The first mode of operation is ratchet induced movement of the vehicle in the forward or reverse direction. The second mode enables free wheeling wherein the ratcheting mechanism is disengaged, for movement of the vehicle over level terrain or for the moving of light loads. A brake mechanism aids in controlling the movement in this mode. Still another mode is a brake mode where the vehicle is stopped or locked from moving, which is accomplished by the ratchet mechanism. Also in the latter mode, the brake mechanism can be used to release the ratchet mechanism from the locked position, where the tongue thrust against the ratchet mechanism is sufficient to require such aid, and as for example where there are twisting moments as may be stored in tandem wheel vehicles or where the vehicle is on an incline.

The apparatus comprises a single dolly wheel rotatably mounted on the forks of the frame. The frame is secured to the vehicle through a pivot socket which receives a cylindrical member from the vehicle and permits pivoting movement of the wheel with respect to the vehicle, without the necessity of elaborate bearings. A yoke is also mounted through forks on the frame for pivotal movement with respect thereto. The yoke carries the driving ratchet mechanism whereas the holding ratchet mechanism is mounted on the frame. A stop is mounted on the yoke to contact the frame fork at extremes of yoke rotation, thereby limiting the arc of rotation and providing for lock-up in the braked mode.

In an exemplary embodiment of the ratchet mechanisms of the invention, both ratchet mechanisms are arranged to present pawls for engagement with the outer periphery of a drive means, or drive disc. Two elongated pawl members are arranged in radially spaced apart relationship, and connected to a helical spring comprising the pawl selector. The pawl selector is held in a selected position by selector positioning means comprising a tab on the exterior of the yoke or frame, whereby the pawl selector may be positioned on either side of the tab or received centrally thereon.

While the exemplary embodiments incorporate a separate drive disc and wheel it is to be understood that it is within the scope of the invention to utilize the wheel as a drive disc.

The drive means comprises a sprocket or disc having a plurality of substantially triangularly shaped teeth around its circumference, so that the end of the selected pawl member engages a substantially perpendicularly related surface of the drive means, and thereby forces the drive means and the wheel connected thereto into rotation, when the actuating handle is moved in that rotational direction. On the return stroke of the handle, the pawl member is forced against the spring bias over the crest of the sproket teeth to fall into position for the next stroke.

In an alternative embodiment for the ratchet mechanism, a pawl carrier is mounted for translation tangent to a toothless drive disc by guide means. The pawl carrier mounts, at opposite ends thereof, roller pawls. The pawls roll on a pawl rail mounted on the frame or yoke. A pawl selector causes either the first or second roller pawl to be translated into engagement with the drive disc effecting drive or holding pawl action by pinching the pawl roller between the pawl rail and drive disc.

With either embodiment of the ratchet mechanism, two ratchet mechanisms are provided. The first is a drive ratchet to induce rotation as described above and the second is a holding ratchet. The holding ratchet mechanism is mounted on the frame and positioned so that the holding pawl will be positioned to oppose rotation opposite to the selected drive direction. In this manner, the apparatus of the invention may be employed to move a vehicle up a grade, there being no necessity to hold the vehicle from rolling back down the grade.

The actuating handle and yoke also have a brake mechanism that functions to apply braking force against rotational movement of the wheel relative to the handle and yoke. This provides additional control of the movement of the dolly, such as when in the free-wheeling mode, and also permits rotational movement of the wheel directly with the movement of the handle. This allows the ratchet mechanisms to be released and changed, even though the weight of the vehicle is holding the ratchet mechanism in a given position.

It is therefore an object of the invention to provide a new and improved multi-mode dolly for vehicles.

It is another object of the invention to provide a new and improved multi-mode dolly for vehicles that requires relatively few moving parts.

It is another object of the invention to provide a new and improved multi-mode dolly for vehicles that has a reduced susceptibility to malfunctions caused by dirt or other contamination.

It is another object of the invention to provide a new and improved multi-mode dolly for vehicles wherein it is possible for a single operator to move heavy vehicles with precise positioning control.

It is another object of the invention to provide a new and improved multi-mode dolly for vehicles that provides steering and movement through a single actuator.

It is another object of the invention to provide a new and improved multi-mode dolly for vehicles that provides forward and reverse drive, free wheeling and braked modes of operation.

It is another object of the invention to provide a new and improved multi-mode dolly for vehicles that is compact and light in weight making it easy to handle and store.

It is another object of the invention to provide a new and improved multi-mode dolly for vehicles with alternative pawl mechanisms.

It is another object of the invention to provide a new and improved multi-mode dolly for vehicles that is relatively inexpensive to manufacture.

Other objects and many attendant advantages of the invention will become more apparent upon a reading of the following detailed description together with the drawings in which like reference numerals refer to like parts throughout and in which:

FIG. 3 is an enlarged sectional view taken on line 3—3 of FIG. 2.

FIG. 4 is an enlarged side elevation view, similar to a portion of FIG. 2, illustrating the ratchet action.

FIG. 5 is a side elevation view of an alternate ratchet structure.

FIG. 6 is a sectional view taken on line 6—6 of FIG. 5.

FIG. 7 is a side elevation view of a modified form of the dolly, incorporating a brake, the brake adjustment handle being cut away.

FIG. 8 is a partial bottom plan view of FIG. 7.

FIG. 9 is a side elevation view, partially cut away, illustrating the action of the brake used as a pawl.

FIG. 10 is a sectional view taken on line 10—10 of FIG. 9.

Figure 1:
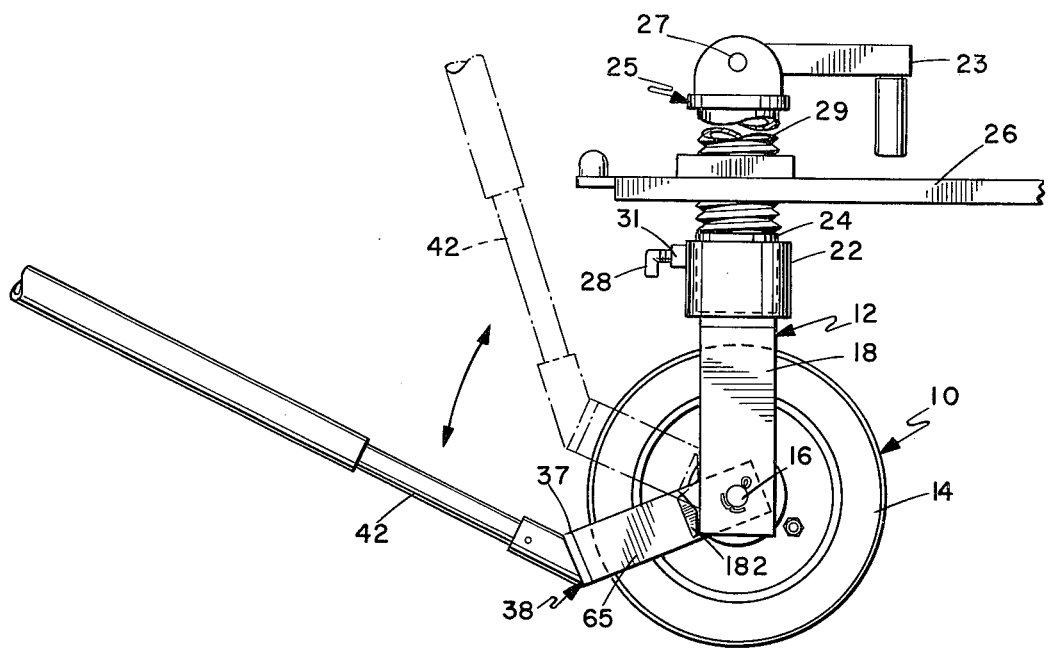
FIG. 1 is a side elevation view of the dolly attached to a trailer tow bar.

Referring now to the drawings, there is illustrated the vehicle dolly 10 of the invention. The dolly is mounted to a vehicle through the vehicle frame extension 26 and screw jack 25. The screw jack is utilized for raising and lowering the vehicle onto a support and includes jack handle 23 pivotally mounted on pin 27 for movement between the stowed position illustrated, and the operating position. The jack post 24 is a cylindrical extension of the jack screw 29 and is received within a pivot socket 22 on frame means 12. The pivot socket is of a slightly larger diameter than the jack post and includes a locking screw 28 received in threaded fitting 31 whereby the apparatus may be retained on the jack screw prior to the screw being lowered to support the vehicle. When the dolly is supporting the vehicle, the locking screw 28 is rotated out of contact with the jack post to permit free pivoting movement between the jack post and pivoting socket.

Referring more particularly to FIG. 3, the frame 12 comprises a horizontal member 20 and two parallel frame forks 18 and 19. The frame forks carry a shaft 16 upon which a dolly wheel 14 is mounted for rotation. The shaft 16 also receives, for pivotal movement, yoke 38 which has a cross member 37 and two leg members 65 straddling the dolly wheel 14 and received on shaft 16. The assembly of the frame, yoke, shaft and wheel is retained by a pair of cotter pins 21.

Figure 2:
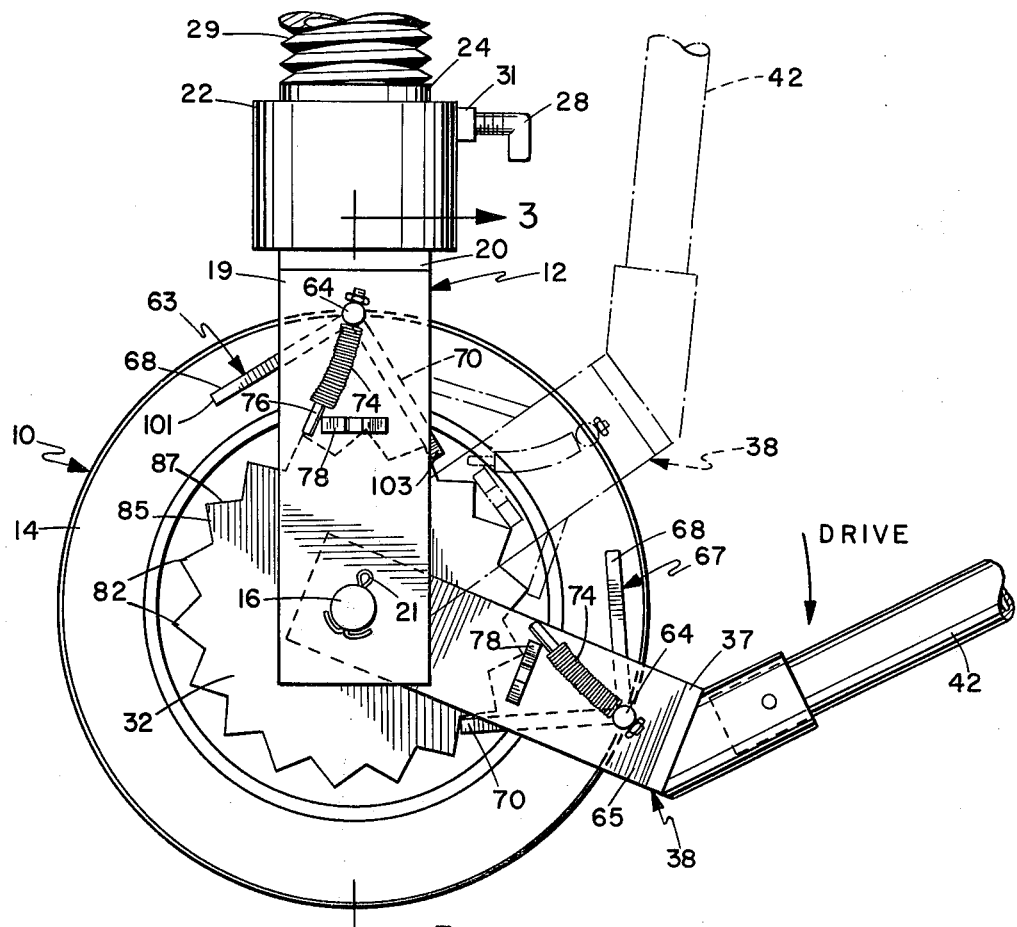
FIG. 2 is an enlarged side elevation view taken from the other side of the dolly.

Wheel 14 has a two part hub 150 and tire 152 and rotates on bearings 154. The wheel has mounted for rotation therewith, the drive means 32. The drive means is secured to the wheel by a plurality of screw fasteners 33, and includes a plurality of teeth 82 around its periphery. The teeth in the embodiment of FIG. 2 are substantially triangular in configuration and have opposed substantially flat faces 85 and 87.

There is mounted on the frame and yoke, a pair of substantially similar ratchet mechanisms 63 and 67. The detailed construction of the mechanism is best illustrated in FIG. 4 which illustrates ratchet mechanism 63 having a pair of elongated pawl members 68 and 70 that have teeth engaging surfaces 101 and 103. These pawls are positioned in a radially spaced apart relationship and have approximately right angular relationship in the instant embodiment. The pawls are secured to a shaft 64 that passes through the fork member 19 and is secured to a free end of a biasing means or coil spring 74 by nut 180. Thus the positioning of the helical spring by its positioning extension 76, will determine the initial positioning of the pawls. A selector positioning means in the form of a tab 78, is provided for positioning the helical spring, which in the instant embodiment, also comprises the pawl selector means. Referring to FIG. 2, movement of the pawl selector means 76 in the ratchet mechanism 67 in clockwise direction to the position illustrated in solid lines causes rotation of pawl 70 into position to engage a surface 85 of the drive means. Thus a clockwise pivotal movement of the yoke 38, induced through handle 42, will cause rotation of the dolly wheel by the force transmitted through pawl 70 to the drive means. Counterclockwise pivotal movement of the yoke 38, will cause the pawl 70 to be forced against the bias of spring 74 up and over the crest of the succeeding teeth, with the bias causing the pawl to drop into each intertooth space so that a power stroke may start with engagement of any tooth 82 by pawl 70. In this manner, small rotational drive increments may be obtained for precision positioning of the vehicle. Similarly, if the pawl selector 76 is lifted over the tab 78 and positioned on the opposite side of the tab 78, the ratchet mechanism 67 will be biased so that 68 will be in position to engage the drive means and will cause a counter-clockwise rotation of the dolly wheel during the upward stroke of the yoke 38 and handle 42.

The holding ratchet mechanism 63 operates in a similar manner, and because it is secured to the fixed frame member, it is utilized for maintaining the rotational position induced through the drive ratchet mechanism. That is, the pawl 70 may be rotated into position to contact the surface 85 of the teeth 82 on drive means 32, and during clockwise rotation of the drive means, and wheel, by downward clockwise movement of the handle and yoke, the pawl 70 will be forced against the bias of spring 74 up and over the crest of the succeeding teeth with the bias causing the pawl to drop into each intertooth space to be in position to engage surface 85 of the drive means and prevent counter-clockwise rotation of the drive means and wheel. Positioning the pawl selector 76 on the opposite side of tab 78 biases the ratchet mechanism 63 to prevent clockwise rotation of the drive disc.

The tab 78 for both the drive and holding ratchet mechanisms includes a central cylindrical notch 84 for the pawl positioning means. This position orients the pawls, so that neither of the pawls contact the teeth 82, as is illustrated in broken line position in FIG. 4 and therefore the wheel is free to rotate. This position would be utilized to eliminate the ratchet action and its associated noise, allowing the dolly to be used as a steered castor with free motion of the wheel in either direction.

The operation of the mechanism is initiated by positioning the drive pawl selector in a position opposite to the holding pawl selector. That is, the drive pawl selector is rotated to the counter-clockwise orientation while the holding pawl selector is in the clockwise orientation. A single stroke of the handle until stop 86 contacts the frame fork 18 will lock the entire dolly against any rotation of the wheel.

Referring now to FIG. 5, there is illustrated an alternative embodiment of the ratchet mechanism of the invention. The ratchet mechanism 120, there illustrated, comprises a pawl carrier 102, received in carrier guides 104. Roller pawls 106 and 108 are mounted for rotation on carrier 102 and roll on a pinch rail 160. The pinch rail is secured to the frame or yoke. In the instant embodiment both toothless drive discs 132 and the pinch rail have a wedge shaped outer or pawl contacting configuration to cooperate with the V-groove 164 in the roller pawls 106 and 108. The wedge - V-groove configuration produces a self-aligning mating of the several surfaces.

A selector spring 122 fixed at one end by connector 123 to the frame or yoke moves the carrier 102 through pivot connector 101. A pair of positioning pins 134 and 136 position free end of selector spring 122 to bias a selected pawl into contact between the disc 132 and rail 160. The ratchet effect is produced by a pinching action, whereby drive or holding force is transferred to the disc through the roller pawl. The action is continuous, that is, drive or holding force is produced with any relative movement and it is not necessary than an incremental distance be traversed prior to engagement as in toothed ratchets.

In using either embodiment described thus far, the device is secured to the jack shaft 24 of a vehicle, by inserting the jack shaft into the pivot socket 22, and securing it initially by locking mechanism 28. The tongue weight of the vehicle is placed on the apparatus through the jack shaft 24 to allow the towing vehicle to be disconnected. The lock screw 28 is loosened to permit pivoting rotation of the apparatus with respect to the vehicle. If the load can be moved without ratcheting action, it is possible to pull or push the vehicle directly and use the apparatus of the invention for steering only. For this operation, both of the pawl selectors are placed in the central position, whereby the pawls would not engage the surface of the drive means. When ratcheting action is required, the pawls are selected to drive in the selected direction. It is then possible to utilize the large mechanical advantage of the apparatus, by successive oscillatory strokes of the handle, to precisely position the trailer in the desired location.

In a modified embodiment, see FIGS. 7 through 10, the dolly 10 is provided with a brake mechanism that functions through the handle 43 and yoke 39 to restrain rotation of the wheel 14 or to lock the wheel 14 relative to the yoke and handle. In this embodiment, the yoke 39 has a pivoting member 170 to which is attached a rigid brake pad 188 having raised tread portions 190. Mounted on the upper end of the handle 43 is a sleeve cap 178 that fits over the upper end of the tubular member 176. A threaded nut 181 is secured such as by welding or the like to the upper end of sleeve 176 and threadably receives stud 182 that is secured to the end of the sleeve cap 178 and to rod 174. Rod 174 projects through alignment bushing 166 and through hole 168 in yoke 39 to contact the brake pad 188. Sleeve 176 fits into ferrule 172 and is held in position by screw 184 that passes through slot 186.

In operation of the brake mechanism, sleeve cap 178 is rotated driving the stud 182 and the connected rod 174 downwardly against brake pad 188, driving the brake pad on its pivotal support 170 against the tire or wheel 14. This selectively applies brake pressure with considerable force that is held until relieved by rotating sleeve 178.

This brake mechanism can be used to lock the wheel 14 relative to yoke 39. Also it will be understood that when the wheel 14 is locked relative to the yoke 39, then the wheel can be rotated by the handle 43. This rotational force is imparted in coordination with the position of pawl 68. Normally it is not intended to rotate the wheel 14 by use of the brake mechanism, as this requires continual releasing and setting of the brake. However there are instances where it is desirable to rotate the wheel with the brake mechanism. Such instances arise, for example, where the wheel 14 is being rotated through the drive mechanism up an incline and it is desirable to reverse the position of pawl 63 to allow the wheel to be rotated in the opposite direction. In this condition, while pawl selector 76 may be moved, pawl 63 will be held in the same locked position against such reverse downhill movement of the wheel, because the entire weight of the vehicle as supported by the tongue is holding the pawl 63 in the locked position. This condition is illustrated in FIG. 7. Normally it is merely necessary to rotate the wheel axis 90° and then move the wheel laterally to the incline to release the pawl 63 and allow the pawl 63 to assume the position dictated by the pawl selector 76. However it is sometimes undesirable to have to rotate the wheel 14, such as where there may be an obstacle to movement of the handle 43. Thus it is advantageous to be able to use the brake mechanism to lock the wheel 14 relative to the yoke 39, and then move handle 43 and rotate the wheel 14 sufficiently to unlock the pawl 63, by removing the load from pawl 63 by rotation of sprocket 32 as for example in FIG. 7 in the counter-clockwise direction wherein pawl 63 will then respond to the resilient biasing of the pawl selector 76 and will move to the position wherein end 103 is then in contact with the teeth of the sprocket 32, as illustrated in FIG. 9. After pawl 63 has released, as illustrated in FIG. 9, the brake may then be released and normal operation of the dolly continued in movement of the wheel 14 in the opposite rotational direction.

A second advantage of the brake is that it can be used to apply proportional braking force to allow slow downhill coasting.

While the invention has been described in connection with its use in moving trailers, it is to be understood that the device is applicable to substantially any wheeled vehicle.

Having described my invention, I now claim:

1. Apparatus for moving and positioning vehicles comprising:
   frame means for attachment to a vehicle,
   said frame means having an axle with a wheel rotatably mounted thereon,
   a drive disc fixed to said wheel,
   a U-shaped yoke with ends rotatably secured to said axle on opposite sides of said wheel, said yoke enclosing said wheel and drive disc,
   handle means secured to said yoke at a connection located outside the circumference of said wheel for rotating said yoke,
   drive pawl means on said yoke for selectively engaging said drive disc,
   drive pawl selector means for resiliently positioning said drive pawl means to engage the said drive disc on alternate strokes of said yoke by said handle,
   holding pawl means on said frame for selectively engaging said drive disc,
   holding pawl selector means for positioning said holding pawl means to engage said drive disc and prevent rotation of said drive disc in one selected direction relative to said frame,
   said drive and holding selector means respectively including means for positioning said drive and holding pawl means so that they do not engage said drive disc and thereby do not interfere with the free rotation of said wheel,
   each of said pawl selector means including pawl biasing means for resiliently biasing said pawls into engagement with said drive disc,
   and brake means for restricting movement of said wheel relative to said yoke.

2. The apparatus of claim 1 wherein:
   pivot socket means secured to said frame means for pivotally receiving an element secured to said vehicle.

3. The apparatus of claim 1 further including:
   stop means for limiting the arc of rotation of said U-shaped yoke.

4. The apparatus of claim 1 wherein:
   said brake means includes a brake pad pivotally connected to said yoke for selective pivoting movement into contact with said wheel,
   and brake operating means for moving said brake pad into contact with said wheel and holding said brake pad against said wheel.

5. The apparatus of claim 4 wherein:
   said brake pad being positioned between the ends of said yoke,
   said handle means comprising a hollow tube,
   said brake operating means including a rod slidably positioned in said tube,
   and means for moving said rod longitudinally in said tube to contact said brake pad.

6. The apparatus of claim 1 including:
   selector positioning means,
   said selector positioning means for retaining each of said spring means and said pawl members in at least two selected positions thereby causing said forward or said reverse pawl member to engage said drive means,
   said selector positioning means for retaining said spring means and said pawl members in a third position in which both of said pawl members are out of engagement with said drive means.

7. Apparatus for moving and positioning vehicles comprising:
   frame means for attachment to a vehicle,
   said frame means having an axel with a wheel rotatably mounted thereon,
   a drive disc fixed to said wheel,
   a U-shaped yoke with ends rotatably secured to said axel on opposite sides of said wheel, said yoke enclosing said wheel and drive disc,
   handle means secured to said yoke at a connection located outside the circumference of said wheel for rotating said yoke,
   drive pawl means on said yoke for selectively engaging said drive disc,
   drive pawl selector means for resiliently positioning said drive pawl means to engage the said drive disc on alternate strokes of said yoke by said handle,
   holding pawl means on said frame for selectively engaging said drive disc,
   holding pawl selector means for positioning said holding pawl means to engage said drive disc and prevent rotation of said drive disc in one selected direction relative to said frame,
   said drive and holding selector means respectively including means for positioning said drive and holding pawl means so that they do not engage said drive disc and thereby do not interfere with the free rotation of said wheel,
   each of said pawl selector means including pawl biasing means for resiliently biasing said pawls into engagement with said drive disc,
   each of said drive and holding pawl means including forward and reverse pawl members,
   said drive and holding pawl selector means each comprising a coil spring means,
   said coil spring means comprising a coil spring secured at one end to said pawl members for movement with said pawl members and having a free opposite end for engaging the means for positioning said drive and holding pawl means.

8. The apparatus of claim 7 including:
   brake means for restricting movement of said wheel relative to said yoke.

9. The apparatus of claim 7 wherein:
   said drive disc comprises a disc having its circumference formed with pawl receiving surfaces.

10. The apparatus of claim 9 wherein:
    said disc is formed with a plurality of substantially triangularly shaped teeth.

* * * * *

UNITED STATES PATENT OFFICE
CERTIFICATE OF CORRECTION

Patent No. 3,937,479          Dated February 10, 1976

Inventor(s) Virgil D. Dalton

It is certified that error appears in the above-identified patent and that said Letters Patent are hereby corrected as shown below:

Column 8, line 19, claim 7, "axel" should read --axle--.

Column 8, line 23, claim 7, "axel" should read --axle--.

Signed and Sealed this twentieth Day of April 1976

[SEAL]

Attest:

RUTH C. MASON
*Attesting Officer*

C. MARSHALL DANN
*Commissioner of Patents and Trademarks*